Feb. 25, 1936.  J. M. BACIGALUPI  2,031,754
EXTENSIBLE COUPLING
Filed Nov. 4, 1932
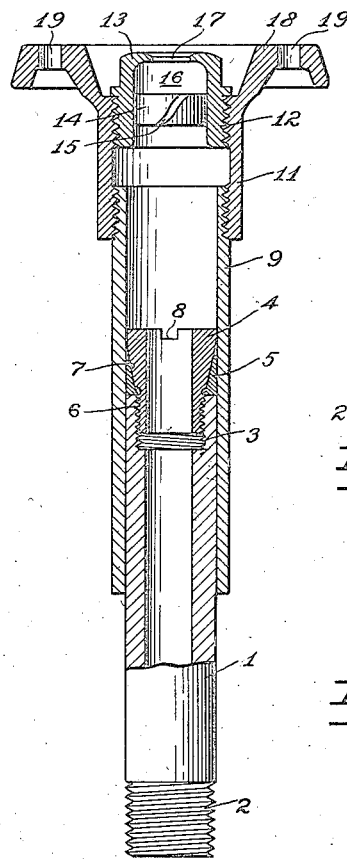
Fig. 1.
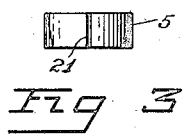
Fig. 2.   Fig. 3.
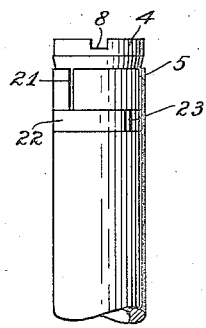
Fig. 4.   Fig. 5.
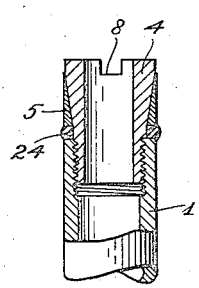 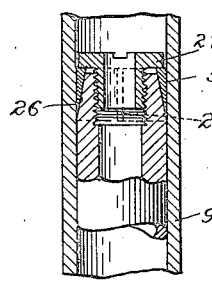 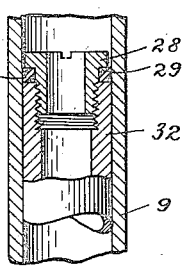
Fig. 6.   Fig. 7.   Fig. 8.
INVENTOR.
Joseph M. Bacigalupi
By Ernest Sweetland
ATTORNEY.

Patented Feb. 25, 1936

2,031,754

UNITED STATES PATENT OFFICE 2,031,754

EXTENSIBLE COUPLING

Joseph Mills Bacigalupi, Oakland, Calif., assignor to Ernest J. Sweetland, Piedmont, Calif.

Application November 4, 1932, Serial No. 641,211

10 Claims. (Cl. 299—60)

This invention relates to improvements in coupling means, and particularly to extensible couplings for water conduits and the like. My invention has a particular application in connection with lawn sprinkling nozzles.

Lawn sprinkler nozzles of the imbedded type remain in the lawn the year around and to obtain the best results it is essential that the nozzles and attendant parts remain even with the lawn surface.

It is a comparatively easy matter to install any nozzle even with the surface of the lawn but those familiar with the art recognize that there is a great deal of inconvenience involved in keeping the ordinary nozzle, which is mounted on a rigid non-extensible pipe, in its proper position with reference to the lawn surface. The ground sometimes settles, leaving the nozzle above the surface to offer an obstruction to the lawn mower and other implements. On the other hand, the surface of a well nourished lawn very often has a tendency to swell and the non-adjustable type of nozzle becomes overgrown and cannot perform its sprinkling function properly.

The present invention relates to a simple and positive extensible coupling means of providing adjustment which makes it possible to raise or lower the sprinkler head and its attendant parts from time to time so that perfect sprinkling results are always attainable. Ordinarily, adjustment of the nozzle to conform to variations in the lawn surface need not be made more than once a year.

My invention will be clearly understood by reference to the accompanying drawing wherein Figure 1 is a sectional elevation of the complete assembled unit.

Figure 2 is a plan view showing the expansible ring which I use for locking the telescopic parts of the nozzle together.

Figure 3 is a side elevation of the ring shown in Figure 2.

Figure 4 is a sectional elevation of a modified form of my invention wherein an additional packing ring is used as a means of avoiding leakage.

Figure 5 is a side elevation of the modification shown in Figure 4.

Figure 6 is a modified form of my invention wherein a packing ring of non-metallic material is used in conjunction with the expanding ring member shown in Figure 1.

Figure 7 is a modification of my invention wherein the tapered expansible ring is inverted and bears against a tapered surface at the end of the nipple.

Figure 8 is a further modification wherein tapered surfaces are omitted and a non-metallic packing may be used.

Referring to the details of the drawing and particularly to Figure 1, the numeral 1 designates a nipple having the external thread 2 which is used to connect with the underground supply line and having an internal thread 3 which receives the hollow screw fitting 4. The numeral 5 designates the expansible ring that is shown in detail in Figures 2 and 3.

The fitting 4 is provided with the straight thread 6 at its lower extremity and at the upper terminal of these threads the walls have tapering sides to form a section of a cone corresponding in angle with the interior slope of the ring 5. This sloping portion is indicated by the numeral 7. At the top of this fitting is a screw driver slot 8 which is accessible from the surface of the lawn when the nozzle is removed from the nozzle casing.

The sleeve 9 is an easy sliding fit over the surface of the nipple 1. This sleeve is threaded at its upper extremity to receive the nozzle housing 11 and has another internal thread at the point 12 to receive the removable nozzle 13. Any form of nozzle housing or nozzle may be used in conjunction with my invention but I have illustrated a conventional form wherein the disc 14, which is equipped with spiral peripheral grooves 15, imparts a swirling motion to the water as it enters the chamber 16 causing it to issue from the aperture 17 in the form of a conical spray. This nozzle and casing are mounted for use so that the surface 18 is substantially level with the surface of the lawn.

The vertical adjustment of the nozzle and casing is effected as follows: Thread 2 being screwed tightly into a suitable fitting on an underground pipe, the tapered fitting 4 is loosened in thread 3 and the natural spring of the ring 5 contracts it so that the sleeve 9 is free to move up or down until the surface 18 is at the proper level, the nozzle 13 being removed during this operation. Proper adjustment having been made, a screw driver is inserted through the housing 11 and sleeve 9 into the slot 8 when the fitting 4 is screwed downward to cause the conical surface 7 to expand the ring 5 and cause it to lock the nipple and sleeve firmly together.

Figure 2 shows a plan view of the tapered ring 5 and Figure 3 shows the same ring in elevation. In these views it will be noted that the outer walls of the ring are parallel while the inner walls taper to conform with the conical surface 7 of the fitting 4. An important feature of the ring 5 is that it is provided with the slit 21 which cuts clear through the ring so that it is free to expand without distortion of the metal. Also, this ring 5 is preferably made of springy material of such size that it enters the sleeve 9 readily when the slit 21 is pinched together.

The particular construction of the fitting 4 and the ring 5, which may be called a pair of annular wedges, is such that while the fitting may always be operated by the insertion of a screw driver into the slot 8, I have found in practice that, in most instances, the connection may be tightened or loosened without the inconvenience of removing the nozzle 13 and introducing a screw driver. This is accomplished as follows: The annular wedge member 4 being in tightened position there is a substantial amount of friction between the outer surface of the ring 5 and the inner walls of the casing 9. Therefore, if the housing 11 is grasped with a tool inserted in the holes 19 from the surface of the lawn and the housing is given a turn to the left, this action due to the friction between the annular ring 5 and the casing 9, causes the annular screw member 4 to turn also in the thread 6, thus loosening the parts so that the sleeve 9 may be moved up or down. After vertical adjustment has been made, the housing 9, which is tightly secured by its thread to the casing 11, is turned to the right when friction between the ring 5 and casing 9 causes the thread 6 to tighten, thus expanding the ring 5 and locking the parts together.

It should be understood that when the ring 5 is expanded against the inner wall of the casing 9 the only possibility of leakage is through the narrow slit 21 of ring 5. I have found by experience that this leakage is slight and unimportant in lawn sprinkling work, but when I use the device for other purposes where leakage is to be entirely avoided I add an additional ring of rectangular cross section as indicated by the numeral 22 in Figure 4. This supplemental ring may be made in various shapes but I have found that a ring having a plain rectangular cross section fulfills the requirements satisfactorily. Various modifications in the shapes of the rings 5 and 22 are possible; for instance their abutting surfaces may be set at an angle, or they may be made to interlock by providing one with a groove and the other with a bead to fit into the groove. This ring 22 is provided with a slit as shown at 23 in Figure 5. The ring 22 is also made of springy metal and of such size that it fits neatly within the casing 9 when the slot 23 is practically closed, so the spring of the metal causes it to hug close to the wall of the casing 9. The device is assembled as shown in Figure 5 so that the slit 21 of the ring 5 does not align with the slit 23 of the ring 22. Each ring therefore acts as a closure for the very small openings produced by the slits 21 and 23 so that leakage is entirely avoided.

In Figure 6 I have illustrated the ring 24 as a substitute for the ring 22 of Figure 5. This modification contemplates the use of a ring of resilient material such as rubber or a compound of rubber and cotton fabric. Or, I may use a ring of asbestos compound or fibre, or I may, if desired, use a ring of lead or solder or other metal soft enough to squeeze out against the walls of the casing and thus form a tight joint.

In the modification shown in Figure 7 the nipple is tapered at its upper extremity as shown at 26 and the ring 5a which is slitted through at the point 21a is caused to expand and lock the telescopic members together when the fitting 27 is screwed downward, causing the ring 5a to expand.

In the modification shown in Figure 8 the hollow plug 28 is provided with a shoulder 29 and a ring of any suitable packing 31 is caused to expand when squeezed between the upper end of the nipple 32 and the shoulder 29.

From the foregoing description it will be clear that the nipple 1 and the casing 9 form a pair of telescopic members which may readily be tightened together to form a substantially water tight joint.

What I claim is:

1. Lawn sprinkling means of the imbedded type comprising a sleeve member with a removable sprinkler nozzle carried thereby, an internally threaded nipple forming a sliding fit within said sleeve member, a hollow screw fitting carried by said nipple within said sleeve and accessible from the lawn surface when said nozzle is removed, an expansible ring surrounding said screw fitting and abutting against said nipple, said screw fitting having an upper portion of larger diameter than the threaded portion, said upper portion being constructed and arranged to expand said expansible ring against said sleeve member when the screw fitting is advanced into the thread of said nipple.

2. Lawn sprinkling means of the imbedded type comprising a pair of tubular telescopic members, a removable sprinkler carried by the outer one of said telescopic members and a tapered hollow plug engaged by a thread to the inner one of said telescopic members, an expansible ring surrounding said tapered plug and abutting against an end of the inner telescopic member, a tool receiving surface forming part of said tapered plug whereby it may be screwed into the inner telescopic member to cause said ring to expand against the inner wall of said outer tubular member, said tool receiving surface being accessible from the lawn surface when said sprinkler is removed.

3. Lawn sprinkling means of the imbedded type comprising a removable sprinkler nozzle, an annular sleeve supporting said nozzle, a nipple telescopically fitted to said sleeve, an expansible ring abutting against said nipple and a hollow screw engaged by said nipple, said hollow screw being accessible from the lawn surface when said nozzle is removed, means forming part of said screw for expanding said ring against the inner wall of said sleeve.

4. A lawn sprinkling device of the imbedded type comprising a nipple attached to an underground water pipe, a thread at the upper end of said nipple, a hollow screw-fitting engaged by said thread and an expansible ring surrounding said screw fitting, a sleeve telescopically fitted to said nipple and engaging said screw-fitting and expansible ring, a removable nozzle in the top of said sleeve which when removed renders said screw-fitting accessible from the lawn surface.

5. Lawn sprinkling means of the imbedded type comprising a sleeve with a removable sprinkler nozzle, a nipple telescopically fitted to said sleeve, an expansible member adjacent the end of said nipple and a hollow screw engaged by said nipple, means forming part of said screw for expanding said member against the inner wall of said sleeve, said hollow screw being accessible from the lawn surface when said nozzle is removed.

6. Coupling means for uniting telescopically fitted tubular members comprising a substantially straight internal thread carried by the inner tubular member, a threaded hollow plug engaged by said internal thread, said plug having a tapered upper portion, an oppositely tapered expansible element surrounding the tapered portion of said plug, tool engaging means whereby said plug may be advanced to cause said expansible element to expand against the inner surface of the outer tubular element.

7. An extensible coupling comprising a sleeve member, a nipple telescopically fitted within said sleeve member; a hollow screw member engaged by an internal thread within an end of said nipple, said screw member having a substantially straight thread on its lower end and an unthreaded tapered portion on its upper end, expansible means associated with the upper end of said nipple in contact with the tapered portion of said screw member, said means being expanded against the inner wall of said sleeve when said screw member is advanced in said sleeve.

8. An extensible coupling comprising a sleeve member, a nipple telescopically fitted to said sleeve, a substantially straight thread carried by said nipple, a hollow screw engaged by said thread, a shoulder on said screw, said shoulder being of greater diameter than the thread on said screw, an expansible ring bearing against said shoulder, said ring being expanded against the inner wall of said sleeve when said hollow screw is advanced in said nipple to form a fluid tight joint between said nipple and said sleeve.

9. Coupling means for uniting tubular members comprising an inner tubular member telescopically fitted within an outer casing, an internal thread in said inner member, a threaded hollow plug engaged by said internal thread, an outwardly extending flange on said plug, a seating surface on said inner tubular member, an expansible ring between said flange and said seating surface constructed and arranged to be expanded against the inner wall of said casing by the pressure of said upwardly extending flange when said hollow plug is advanced.

10. Coupling means for uniting tubular members comprising a pair of telescopically fitted tubular members, an internal thread formed on the smaller of said tubular members, a hollow plug having an external thread to engage said internal thread, said plug having an upper enlarged shoulder constructed and arranged to engage and expand an annular sealing element adjacent one end of said smaller tubular member against the inner wall of the larger tubular member to hold said telescopic elements in sealed engagement with each other.

JOSEPH MILLS BACIGALUPI.